(12) United States Patent
Wilkerson, Jr.

(10) Patent No.: US 7,114,316 B1
(45) Date of Patent: Oct. 3, 2006

(54) ROLLING LAWN TRIMMER CARRIAGE

(75) Inventor: William Morgan Wilkerson, Jr., Tryon, NC (US)

(73) Assignee: William M. Wilkerson, Jr. Trust, Columbus, NC (US)

( * ) Notice: Subject to any disclaimer, the term of this patent is extended or adjusted under 35 U.S.C. 154(b) by 497 days.

(21) Appl. No.: 10/094,526

(22) Filed: Mar. 11, 2002

(51) Int. Cl.
*A01D 34/84* (2006.01)

(52) U.S. Cl. .................................. 56/12.7; 56/17.5

(58) Field of Classification Search .............. 56/12.7, 56/17.5
See application file for complete search history.

(56) References Cited

U.S. PATENT DOCUMENTS

| | | | | |
|---|---|---|---|---|
| 4,936,886 A | * | 6/1990 | Quillen ...................... 56/16.7 |
| 5,408,816 A | * | 4/1995 | Cartier ....................... 56/17.5 |
| 5,829,236 A | * | 11/1998 | Ballard et al. ............... 56/16.7 |
| 5,884,462 A | * | 3/1999 | Gerber ....................... 56/12.1 |
| 6,009,694 A | * | 1/2000 | Moore et al. ................ 56/12.7 |
| 6,085,503 A | * | 7/2000 | Hutchinson ................ 56/12.7 |

* cited by examiner

*Primary Examiner*—Meredith C. Petravick
(74) *Attorney, Agent, or Firm*—Dougherty Clements

(57) ABSTRACT

A rolling lawn trimmer carriage incorporates a remote trimmer motor control. The carriage may include adjustable mounting bracket means for attaching a lawn trimmer in various positions on the carriage base. A means for parking the carriage in a stationary position is desirably provided to facilitate servicing of a trimmer attached to the carriage.

17 Claims, 3 Drawing Sheets

Side View

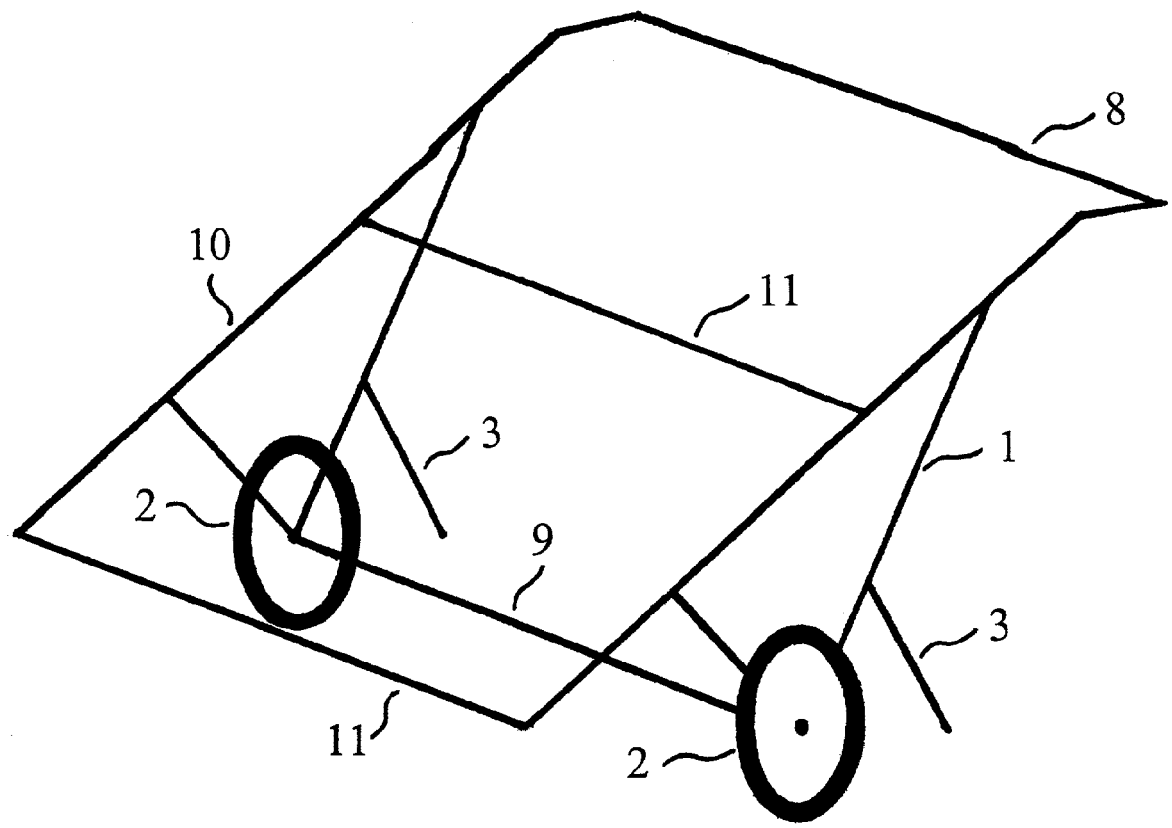
FIG. 1: Perspective View

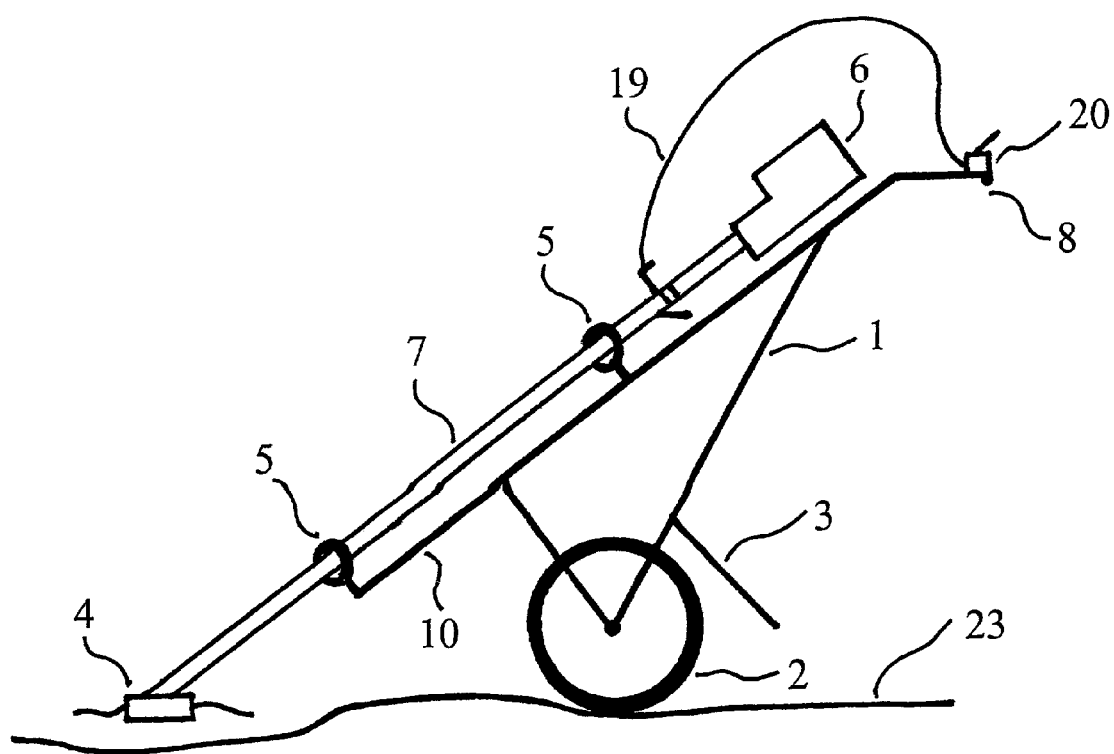
FIG. 2: Side View

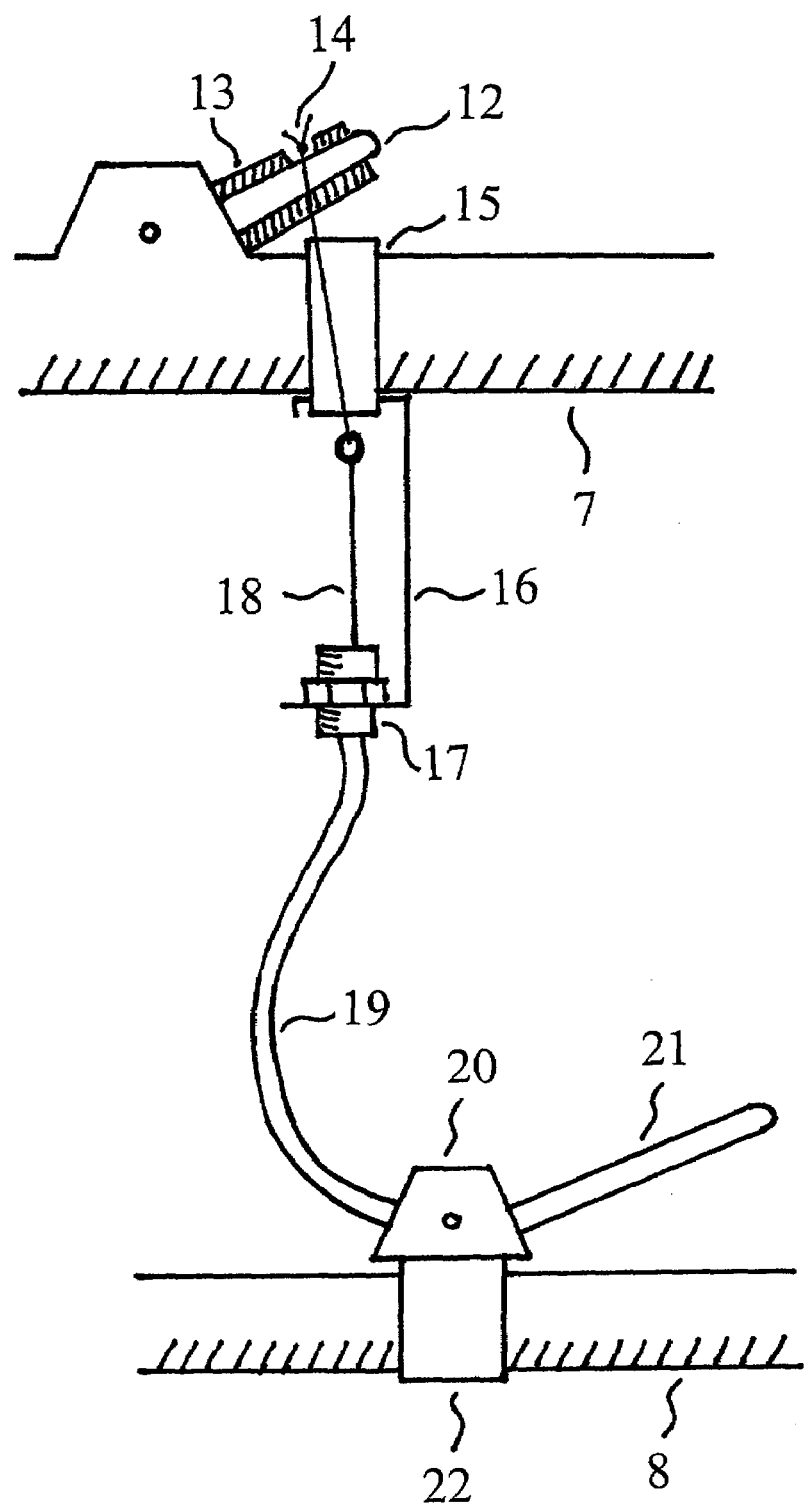
FIG. 3: Remote Throttle Control Assembly

ROLLING LAWN TRIMMER CARRIAGE

BACKGROUND OF THE INVENTION

Portable rotary-head lawn trimmers have become a commonplace item for use in lawn maintenance. Such trimmers typically consist of a rotary motor or engine, the driveshaft of which is coupled to a rotary cutting head by means of an elongated rotating shaft or cable. These devices perform a useful function by allowing the operator of the trimmer to cut grass, weeds, and seedlings in areas which may not be accessible by conventional lawn mowers. However, as hand-carried devices, these trimmers require that the operator manipulate and maneuver the trimmer while supporting its weight manually or with the aid of a shoulder strap from which the trimmer is suspended. Carrying and manually maneuvering the trimmer requires a level of physical exertion that may be stressful and produce fatigue for the operator.

The invention described herein provides a (means for utilizing) rolling apparatus for using a lawn trimmer without having to carry its weight. Various lawn trimmer carriage devices exist in a relatively crowded field of prior art, but there is still an unmet need for a design that allows the use of a lawn trimmer carriage to duplicate the major functions achievable by manual lawn trimmer operation, and to do so with relative ease and economy.

BRIEF SUMMARY OF THE INVENTION

This invention consists of a rolling carriage upon which a trimmer is mounted for weight support and maneuverable operation of the trimmer. The carriage consists of one or more mounting brackets (means) for attachment of a lawn trimmer; a rollable base with ground engaging wheels which supports the mounting brackets (means); (rolling means for rollably supporting the base on an underlying surface;) a handle coupled to the base for manually maneuvering the base; (and motor control means) an actuator for remotely controlling the motor of a trimmer carried on the mounting brackets; (means.) and a parking mechanism for securing the rollable base in a stationary position.

It is (desirable) essential that the (rolling means) rollable base function to allow the operator to tilt the carriage forward and backward, and to turn and pivot the carriage with ease, in order to provide the maneuverability necessary for trimming. This may be accomplished by utilizing a single linear axle with rolling wheels mounted on each of the two ends of the axle to support the base, with the axis of rotation of the wheels being perpendicular to the direction of travel of the base, and with the weight of the base and trimmer attached thereto substantially balanced over the axle/wheel assembly for ease of handling. This configuration also allows the operator to tip the carriage forward for bringing the rotating trimmer head into contact with the ground in order to feed cutting string from the head.

The orientation of the mounting brackets (means) may be adjustable to provide a (means) method of varying the position of the trimmer on the carriage base, thereby allowing the trimmer to be operated in various positions for various functions including mowing, edging, and trimming lawn boundaries adjacent walls and fences.

The parking (means) mechanism may (be included to secure the carriage in a stationary position on an underlying surface) consist of a structural member coupled to the base for making frictional contact with the underlying surface when the base is tilted backwards about the axis of rotation of the wheels. This allows easy rapid parking and (to) facilitates servicing of a trimmer mounted on the carriage.

(In preferred embodiments of the invention, the carriage base may include a downwardly slanted section upon which the trimmer is attached with one or more mounting brackets. The carriage base may also incorporate a handle by which the operator may manually grasp and manipulate the carriage. The remote trimmer motor control means may consist of a remote trimmer throttle actuator attached to a handle section of the base for ease of access by the operator.)

(The base may also include a structural element which makes frictional contact with the underlying surface when the carriage is tilted backward, for parking the carriage in a stationary position.)

Additional features and advantages of the invention will become apparent to those skilled in the art upon consideration of the preferred embodiment.

BRIEF DESCRIPTION OF THE DRAWINGS

The detailed description particularly refers to the accompanying figures in which:

FIG. 1 is a perspective view of a preferred embodiment of the present invention, showing the base (and rolling unit) with handle and axle/wheel assembly.

FIG. 2 is a side elevation view of the assembly in FIG. 1, showing a lawn trimmer attached to the base with mounting brackets.

FIG. 3 is a diagrammatic view of a remote throttle control actuator coupled to a trimmer motor throttle level (with) by a cable-in-sleeve assembly.

DETAILED DESCRIPTION OF THE INVENTION

A preferred embodiment of the invention consists of tubular metal or plastic base frame (1) with a downwardly sloping frame aspect (10) for attaching the trimmer shaft (7) to the base frame by (bracket means) mounting brackets consisting of clamps (5). These clamps (5) can be opened to receive the trimmer shaft (7), then closed and tightened to secure the trimmer shaft to the carriage base frame with the trimmer motor (6) in proximity to the handle section (8) of the base frame and the rotary cutting trimmer head (4) in proximity to the underlying surface (23).

The base frame (1) consists of two parallel structures connected by a series of perpendicular struts which are oriented horizontally in space (FIG. 1). Two of these struts (11) are positioned in the downwardly sloping part of the carriage frame (10), and are utilizing for adjustable attachment of the trimmer shaft (7) by (means of) clamps (5). By varying the position in which the trimmer shaft (7) is attached to the struts (11) by the clamps (5), the position of the trimmer relative to the base may be varied. One of the horizontal struts is comprised of an axle (9) which is positioned such that the weight of the carriage with attached trimmer (is) may be substantially balanced over the longitudinal axis of the axle (9). Rolling wheels (2) are mounted on each end of the axle. The base frame includes parking support legs (3) which make frictional engagement with the underlying surface when the carriage is titled backwards.

A remote throttle control actuator (20) is attached to the handle section (8) of the base frame by a clamp (22). The remote throttle actuator (20) communicates with the trimmer engine throttle trigger (12) by (means of) a cable-in-sleeve assembly. The terminal end (17) of the cable sleeve (19) is fastened to a bracket (16) which is held in place on the trimmer shaft (7) by a clamp (15). The trimmer engine throttle trigger (12) is covered by a notched rubber sleeve (13). The circular end of the cable (18) is connected to the trimmer throttle trigger (12) by a loop of string (14) which is tied to the engine throttle trigger (12) at the notched portion of the rubber sleeve (13).

To accelerate the trimmer engine, the operator moves the spring-loaded lever (21) on the remote throttle actuator (20) toward the carriage handle (8), thereby pulling the cable (18) and the string loop (14), and thus pulling the spring-loaded trimmer throttle trigger (12) and increasing the trimmer engine speed. When the operator releases the spring-loaded throttle level (21), the trimmer engine returns to idle speed.

What is claimed is:

1. A lawn trimmer carriage for rolling movement on an underlying surface, said carriage comprising, in combination:
    mounting means for removable attachment of a lawn trimmer to an underlying support base, and
    a support base for carrying a lawn trimmer attached to said support base by said mounting means, said support base having a plurality of parallel ground engaging wheels spaced apart on a linear axis of rotation, wherein said linear axis of rotation is perpendicular to the direction of travel of said support base, and wherein said linear axis of rotation of said wheels is positioned under the center of gravity of said support base with a lawn trimmer attached thereto, whereby the weight of said support base with a lawn trimmer attached thereto may be substantially and pivotally balanced above said linear axis of rotation of said wheels by the user for trimming, and
    handling means coupled to said support base, said handling means being adapted for allowing the user to maneuver said support base over the ground, and
    remote motor control means for remotely controlling the motor of a lawn trimmer attached to said support base, and
    parking means for securing said support base in a stationary position on an underlying surface when said support base is rotated backwards about the rotational axis of said wheels.

2. The rolling lawn trimmer carriage of claim 1, wherein said mounting means further includes at least one adjustable orientation mounting means adapted for adjustable attachment of a lawn trimmer to said support base.

3. The rolling lawn trimmer carriage of claim 1, wherein said support base further includes at least one horizontally disposed member adapted for laterally adjustable attachment of said mounting means.

4. The rolling lawn trimmer carriage of claim 1, wherein said parking means further comprises at least one fixed structural member coupled to said support base, said fixed structural member being adapted for making frictional engagement with an underlying surface when said support base is rotated backwards about the rotational axis of said wheels.

5. The rolling lawn trimmer carriage of claim 1, wherein said support base is further comprised of a tubular structural frame.

6. The rolling lawn trimmer carriage of claim 1, wherein said remote motor control means is comprised of an actuator coupled to a lawn trimmer motor control switch by a movable flexible cable.

7. A lawn trimmer carriage for rolling movement on an underlying surface, said carriage comprising, in combination:
    at least one mounting bracket for removable attachment of a lawn trimmer to an underlying support base, and
    a support base for carrying a lawn trimmer attached to said support base by said mounting brackets, said support base having a plurality of parallel ground engaging wheels spaced apart on a linear axis of rotation, wherein said linear axis of rotation is perpendicular to the direction of travel of said support base, and wherein said linear axis of rotation of said wheels is positioned under the center of gravity of said support base with a lawn trimmer attached thereto, whereby the weight of said support base with a lawn trimmer attached thereto may be substantially and pivotally balanced above said linear axis of rotation of said wheels by a user for trimming, and
    a handle coupled to said support base, said handle being adapted for allowing the user to maneuver said support base over the ground, and
    a remote motor control actuator coupled to the motor of a lawn trimmer attached to said support base, and
    a parking member coupled to said support base, said parking member being adapted for allowing the user to secure said support base in a stationary position on an underlying surface when said support base is rotated backwards about the rotational axis of said wheels.

8. The rolling lawn trimmer carriage of claim 7, wherein said mounting brackets further include at least one adjustable orientation mounting bracket adapted for adjustable attachment of a lawn trimmer to said support base.

9. The lawn trimmer carriage of claim 7, wherein said support base further includes at least one horizontally disposed member adapted for laterally adjustable attachment of said mounting brackets.

10. The rolling lawn trimmer carriage of claim 7, wherein said parking member further comprises at least one fixed structural member coupled to said support base, said fixed structural member being adapted for making frictional engagement with an underlying surface when said support base is rotated backwards about the rotational axis of said wheels.

11. The rolling lawn trimmer carriage of claim 7, wherein said support base is further comprised of a tubular structural frame.

12. The rolling lawn trimmer carriage of claim 7, wherein said remote motor control actuator is coupled to a lawn trimmer motor control switch by a movable flexible cable.

13. A method of operating a lawn trimmer, comprising in combination:
    providing a lawn trimmer removably attached to a rollable carriage for rolling movement on an underlying surface, and
    providing said rollable carriage which comprises, in combination:
        at least one mounting bracket for removable attachment of a lawn trimmer to an underlying support base, and
        a support base for carrying a lawn trimmer attached to said support base by said mounting brackets, said support base having a plurality of parallel ground engaging wheels spaced apart on a linear axis of rotation, wherein said linear axis of rotation is perpendicular to the direction of travel of said support base, and wherein said linear axis of rotation of said wheels is positioned under the center of gravity of said support base with a lawn trimmer attached thereto, whereby the weight of said support base with a lawn trimmer attached thereto may be substantially and pivotally balanced above said linear axis of rotation of said wheels by the user for trimming, and a handle coupled to said support base, said handle being adapted for allowing the user to maneuver said support base over the ground, and a remote motor control actuator coupled to the motor of a lawn trimmer attached to said support base, and a parking member coupled to said support base, said parking member being adapted for allowing the user to secure said support base in a stationary position on an underlying surface when said support base is rotated backwards about the rotational axis of said wheels, whereby the user may operate said lawn trimmer mounted on said rollable carriage by alternately trimming with said lawn trimmer, and parking said rollable carriage by using said parking member.

14. The lawn trimmer operating method of claim 13, wherein said mounting brackets further include at least one adjustable orientation mounting bracket adapted for adjustable attachment of a lawn trimmer to said support base.

15. The lawn trimmer operating method of claim 13, wherein said support base further includes at least one horizontally disposed member adapted for laterally adjustable attachment of said mounting bracket.

16. The lawn trimmer operating method of claim 13, wherein said parking member further comprises at least one fixed structural member coupled to said support base, said fixed structural member being adapted for making frictional engagement with an underlying surface when said support base is rotated backwards about the rotational axis of said wheels.

17. The lawn trimmer operating method of claim 13, wherein said remote motor control actuator is coupled to a lawn trimmer motor control switch by a movable flexible cable.

* * * * *

UNITED STATES PATENT AND TRADEMARK OFFICE
CERTIFICATE OF CORRECTION

| | | |
|---|---|---|
| PATENT NO. | : 7,114,316 B1 | Page 1 of 1 |
| APPLICATION NO. | : 10/094526 | |
| DATED | : October 3, 2006 | |
| INVENTOR(S) | : William Morgan Wilkerson, Jr. | |

It is certified that error appears in the above-identified patent and that said Letters Patent is hereby corrected as shown below:

Col. 1, line 41: delete "securing", replace with --resting--.
Col. 1, line 64: delete "secure", replace with --rest--.
Col. 2, line 50: delete "utilizing", replace with --utilized--.

Signed and Sealed this

Eighteenth Day of March, 2008

JON W. DUDAS
*Director of the United States Patent and Trademark Office*